Jan. 17, 1967 T. S. ZASTROW 3,298,656
FOAM INSULATION FORMING FIXTURE
Filed Oct. 2, 1964 3 Sheets-Sheet 1
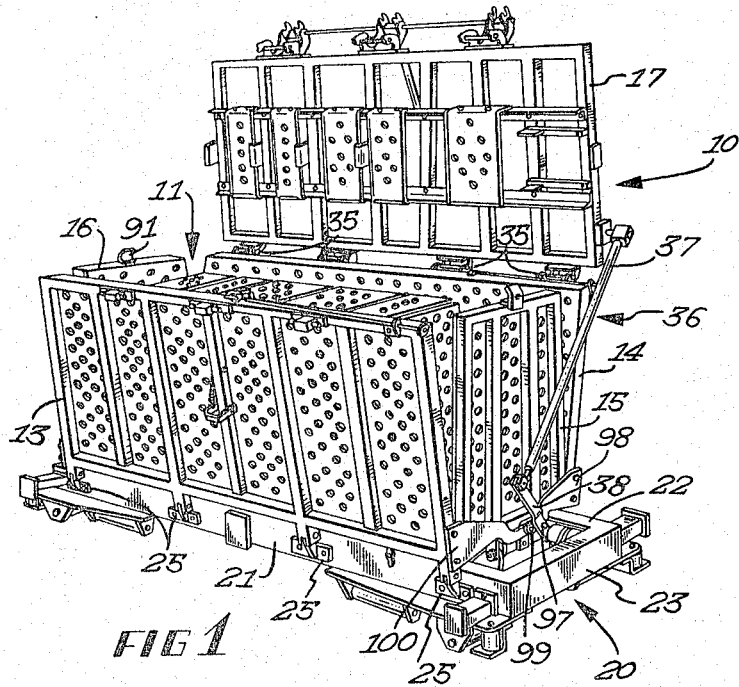
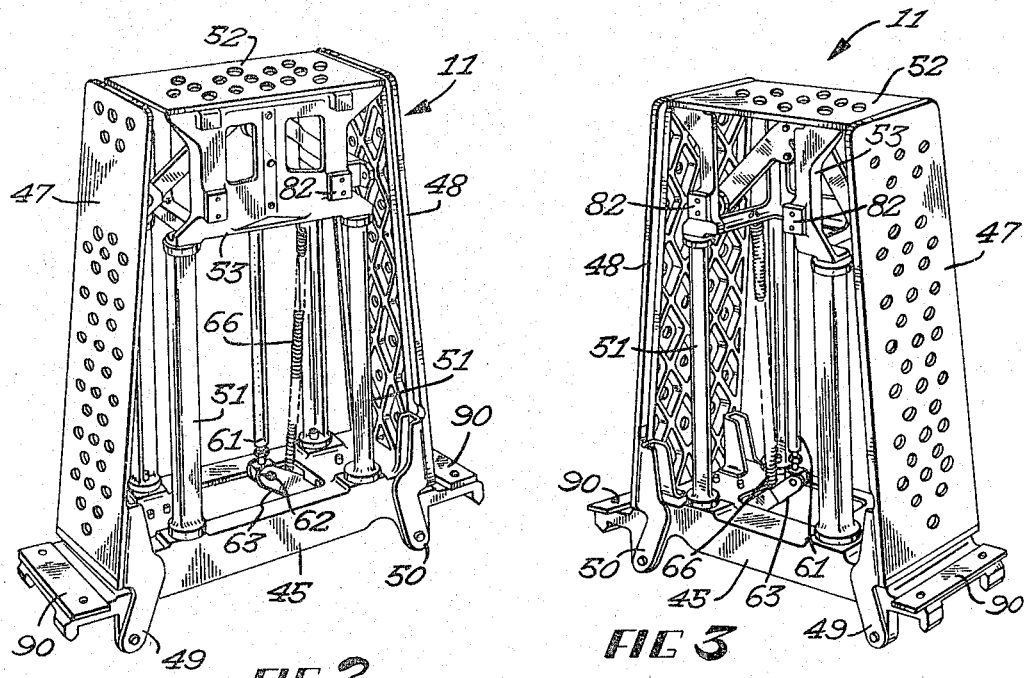
INVENTOR.
THOMAS S. ZASTROW
BY
Meyers & Peterson
ATTORNEYS Jan. 17, 1967  T. S. ZASTROW  3,298,656
FOAM INSULATION FORMING FIXTURE
Filed Oct. 2, 1964  3 Sheets-Sheet 2

INVENTOR.
THOMAS S. ZASTROW
BY Meyers & Peterson
ATTORNEYS

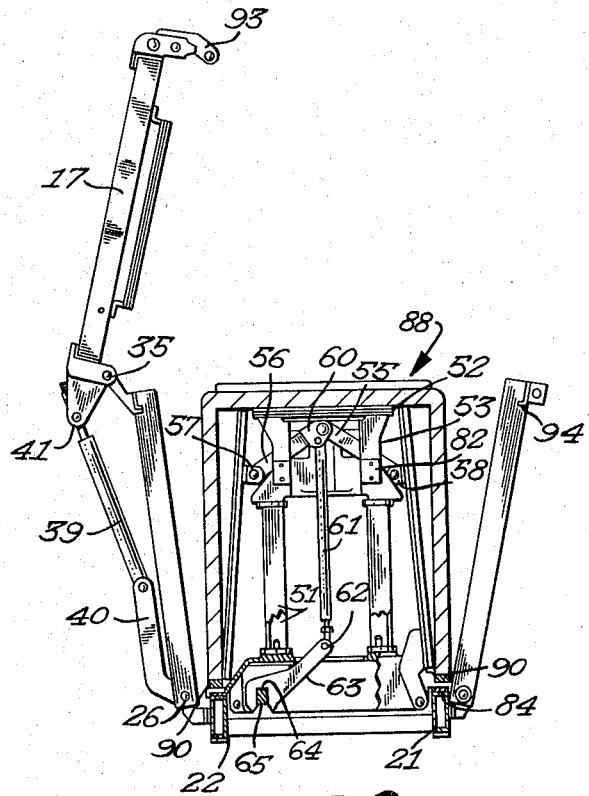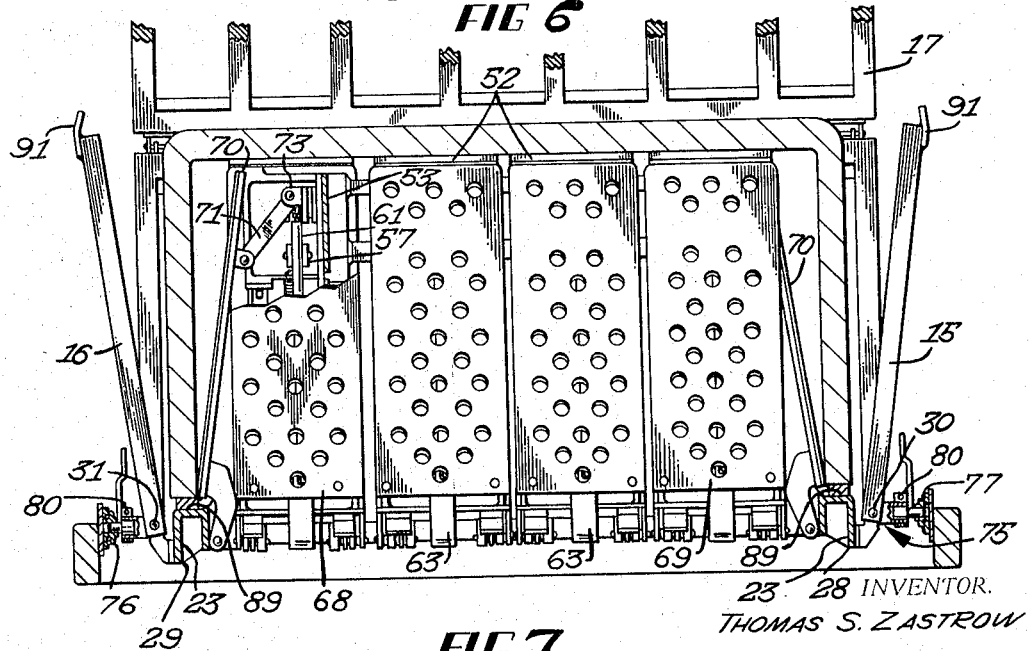

3,298,656
FOAM INSULATION FORMING FIXTURE
Thomas S. Zastrow, St. Paul, Minn., assignor to Remmele Engineering, Inc., St. Paul, Minn., a corporation of Minnesota
Filed Oct. 2, 1964, Ser. No. 401,107
12 Claims. (Cl. 249—152)

The present invention relates generally to an apparatus or fixture in use in connection with forming and filling foamed-in-place resin in an annular cavity area disposed between spaced substantially rigid surfaces, and more particularly to such an apparatus which is well suited for use in connection with the formation of a construction panel, wall panel or the like which comprises a foamed resin core arranged between two spaced apart solid surfaces.

Foamed-in-place resin is widely used at the present time, particularly for thermal insulation applications. In this connection, the thermal insulation qualities as well as the mechanical properties of foamed-in-place resin insulation are considered exceptional, and are widely preferred over the batt insulation which has been widely used in the past. The thermal insulating qualities of a one inch thick barrier of foamed polyurethane resin having closed cell construction and having a modest density is equivalent to several inches of conventional glass wool batt insulation. The refrigerator and freezer appliance industry normally employs a pair of spaced apart sheet metal surfaces having an annular insulation barrier interposed therebetween. Foamed-in-place resin is widely used in connection with these appliances in view of the superior mechanical and thermal properties of the panel or surface. Inasmuch as the finished structure may be provided with a substantially smaller volume of insulation and a lighter metal shell than would otherwise be required with conventional batt insulation, a substantially greater interior volume is possible with equivalent exterior dimensions when foamed-in-place resin is utilized for thermal insulation purposes.

In the art of building, constructing or forming these devices, the provision of a confining surface for the exterior of the panel or enclosure is relatively easily accomplished. However, the provision of an inner or interior core fixture is not as readily arranged or accomplished. One specific requirement of the core fixture is that it be both expandable and collapsible. In other words, the core fixture must be capable of being expanded into an operative configuration, and thereafter being collapsed in order to permit removal of the fixture from the finished product subsequent to the expansion or foaming of the resin mixture and the substantial curing thereof. In addition, appliances such as refrigerators and freezers generally have an unusual configuration which may include certain internal cavity areas for the accommodation of a compressor as well as the provision of a pair of separated compartments or zones wherein the temperature in the various zones may be held at substantially different levels. Thus, it is apparent that these enclosures, in order to be satisfactorily fabricated with foamed-in-place resin, must be provided with internally arranged or disposed rigid core fixtures which may be initially placed within the enclosure, expanded into the desired dimensional configuration, and then collapsed subsequent to the foaming operation in order to permit removal of the core fixture from the finished product.

It is essential that careful dimensional control of the enclosures be exercised in order that the various appurtenances, such as doors or other mating panels may be mounted thereon in a substantially uniform manner from one unit to another. Thus, mass production techniques may be employed when using the fixture apparatus of the present invention.

Two problems which frequently develop in the preparation of the core molds for foamed-in-place resin or similar materials relate to the size of the internal core, and to the means by which the core fixtures are expanded and contracted. In this connection, an appliance manufacturer may produce only a limited quantity of enclosures of a given size at a given time. Thus, it is desirable for him to be able to modify the core equipment to accommodate various size devices. The lateral dimensions are frequently constant, one unit size to another, while the horizontal dimensions of the core is the primary dimension subject to change. Accordingly, the horizontal dimension may accordingly be modified by merely changing the internal length of the internal core molding fixture. This may be accomplished by utilizing a plurality of mating interior core fixtures, one or more of which may be conveniently added or removed, as necessary, in order to accommodate the various internal dimensions.

Turning now to the actuating technique or mechanism, it is normally preferred that a minimum number of actuating points be provided in order to limit the extent of internal access required, and to provide simultaneous actuation of each surface of the fixture. Thus, in an installation requiring a plurality of inner-core segments, a single coupling means is preferably utilized for the individual expansion and contraction units. In addition, it is normally requisite that the coupling means be capable of being uncoupled in a relatively simple fashion. Furthermore, dimensional accuracy require that the units which are capable of being readily coupled and uncoupled, utilize a coupling technique which readily determines the disposition of the individual units, one from another.

On occasion, during a production situation, a leak will develop within the core structure, and when this event occurs, it is absolutely essential that the equipment be stripped down, forthwith, in order to permit cleaning and removal of the foamed or frothed material prior to its becoming set. The fixture apparatus of the present invention is readily disassembled in order to permit early cleaning in the event of a production leak.

Briefly, in accordance with the present invention, an expandable-collapsible core fixture is provided which has a plurality of modules, each module being provided with one or more relatively movable surfaces. The surfaces are movable in order to properly expand or contract the internal configuration of the units. In order to accomplish relative movement of the surfaces of each of the modules, a single drive shaft, comprising an elongated drive shank for driving each of the modules is provided in order to couple the movement of the shaft to provide unitary motion. The motion is such that a relatively short arc may be traversed by the shaft in order to expand or contract the individual modules from a fully expanded configuration into a fully collapsed configuration. It will be appreciated that the fixture is expanded during the foaming operation, and collapsed in order to expedite removal of the core fixture from the finished product.

The modular construction of the internal core fixture makes it possible to produce insulated enclosures with a minimum of production equipment. In order to modify the design of the fixture to accommodate the various production devices, modules may be readily and simply provided or removed. In addition, the surface contacting plates may be easily removed and a new set attached to the individual module members as required. Naturally, the equipment may be modified to handle various sizes of production devices by merely adding to or taking away from the number of modules included in the fixture assembly. Thus in an extremely short period of time it is possible to modify the specific arrangement of the modules in order to accommodate a substantially different enclosure design, this change-over being expeditiously accomplished.

Therefore, it is an object of the present invention to provide an improved modular expandable core fixture which is specifically adapted for versatility in adaptation to operations for maintaining a predetermined configuration in a operation wherein the frothed resin is foamed-in-place in an annular zone between a pair of spaced apart surfaces to form a solid panel.

It is further an object of the present invention to provide an improved modular fixture apparatus for preparing a device or panel having a frothed or foamed-in-place resin disposed in an annular cavity zone therein, the foaming operation being accomplished while the outer and inner surfaces of the device are rigidly and securely held in place by means of an internally disposed highly versatile expansible core fixture assembly.

It is yet a further object of the present invention to provide an improved modular expansible core for use in connection with foamed-in-place resin, wherein the expandable core comprises a plurality of individual module units each being readily added to or removed from the assembly, and having means for expanding and contracting various movable surfaces thereof simultaneously as the operation requires.

It is still a further object of the present invention to provide an improved modular expandable core fixture for use in connection with foamed-in-place resin wherein an individual module unit may be expeditiously added to or withdrawn from the modular assembly for a change-over operation.

Other and further objects of the present invention will become apparent to those skilled in the art upon consideration of the following description, appended claims, and accompanying drawings wherein:

FIGURE 1 is a perspective view of a foamed-in-place resin fixture including an outer shell structure, the interior thereof being filled with individual modular core elements, the outer shell being illustrated in open position;

FIGURE 2 is a detail perspective view of one modular element of the inner core assembly;

FIGURE 3 is a detail perspective view similar to FIGURE 2 in showing the back side of the modular element illustrated in FIGURE 2;

Figure 4:
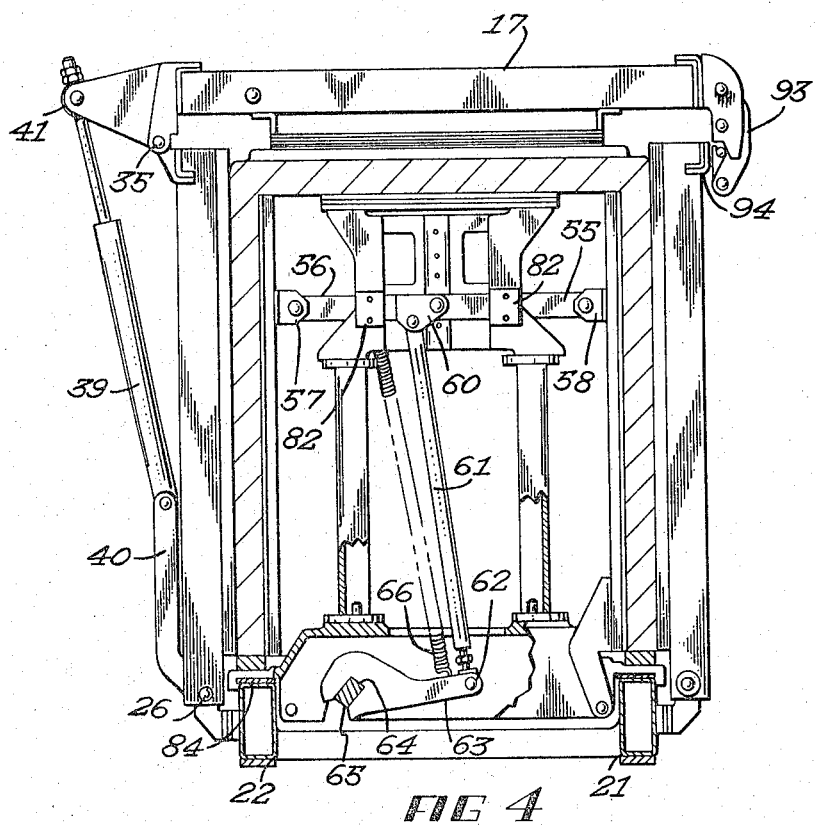
FIGURE 4 is a vertical sectional view taken along the line and in the direction of arrows 4—4 of FIGURE 5.

FIGURE 6 is a vertical sectional view taken along the line and in the direction af arrows 6—6 of FIGURE 7, and similar to FIGURE 4 with the exception that the outer shell is shown open and the inner modular cores are shown in contracted form; and, FIGURE 7 is a vertical sectional view taken along the line and in the direction of the arrows 7—7 of FIGURE 6, and showing a portion of the structure broken away in order to expose the operation of the end plates of the modular units.

In accordance with the preferred modification of the present invention, the foaming fixture shown in the drawings includes an outer shell assembly 10 together with a group of inner core modules generally designated 11. The outer walls of the fixture 10 are pivotally mounted in order to permit the product to be readily inserted and removed, these walls coupled for movement simultaneously with the movement of the walls of the modules. In addition, spaced perforations are provided in order to assist in extracting heat from the fixture at a relatively rapid rate due to the exothermic nature of the frothing reaction. The dimensions of the outer fixture are, of course, arranged to accommodate the inner modules in a predetermined disposition therewithin.

Figure 5:
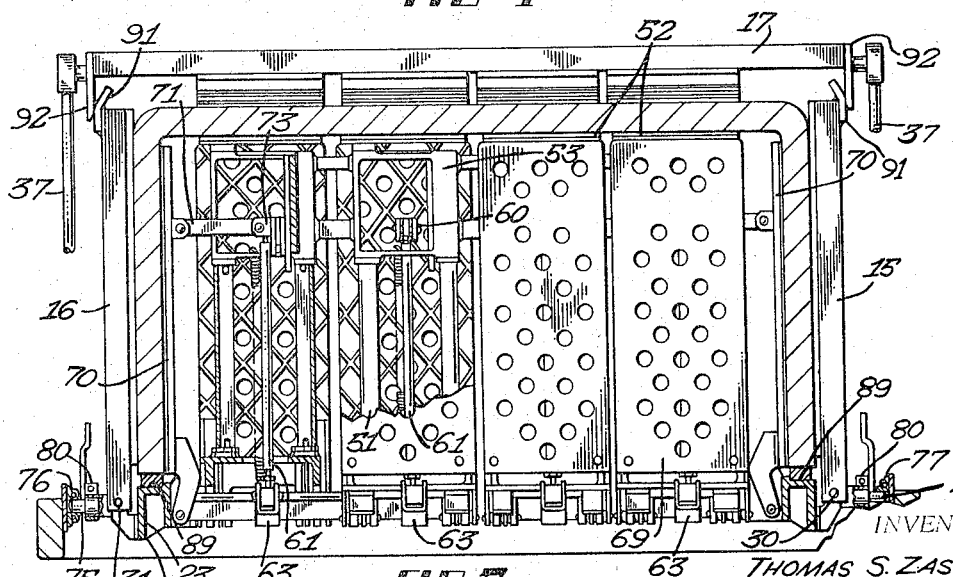
FIGURE 5 is a vertical sectional view taken along the line and in the direction of the arrows 5—5 of FIGURE 4, this view being taken substantially parallel to the longitudinal axis of the fixture assembly.

The outer shell 10 includes a plurality of walls including the front wall 13, back wall 14, end walls 15 and 16, and a top wall 17. In the normal use of a fixture of this type, there is no need for a bottom wall since the product being prepared normally has one open surface such as the front surface wherein a door panel is hingedly attached in a later production step. The entire fixture assembly is arranged to rest upon the main frame member 20 which includes a pair of longitudinal beam members or rails 21 and 22 together with a pair of end cross-members such as the cross-member 23. Support feet are provided, as required, for the beams and rails. For suitable rigidity in the over-all structure, the cross-member 23 represents only one of the many similar cross-members which tie the beams 21 and 22 together. Because of the magnitude of the forces involved in the foaming operation, it is particularly desirable to have the individual members 21 and 22 rigidly secured together in order to prevent warping or distortion which, if permitted to occur, would introduce corresponding warping and deformations in the product. The front wall panel 13 is pivotally mounted on the beam 21 by means of the individual pivot members 25—25, and the rear panel is correspondingly hingedly secured to the beam 22 by means of the pivotal mounting members 26. The end walls 15 and 16 are pivotally mounted on the cross-members 28 and 29 respectively by means of a suitable pivotal joint such as at 30 and 31. Thus, the end panels may pivot between the closed disposition as shown in FIGURE 5 and the open disposition shown in FIGURE 7. The top or cover member 17 is adapted to be pivotally opened and closed. In this connection, the hinge members 35 are arranged to permit the pivotal opening and closing of the top thereabout, this motion being assisted at least in part by means of the link arm 36 which includes an upper segment 37 and a lower connecting arm or segment 38, the two segments being joined together at a pivotal point, the free ends of the link arm 36, such as the ends of the link members 37 and 38 being secured to the top 17 and to the longitudinal rotatable shaft member 75 which passes through the entire assembly, end-to-end. This arrangement permits the top 17 to be freely opened and closed as required, the specific operation being discussed in detail hereinafter. In order to withstand the internal pressures generated during the expansion of the resin, the top member 17 must be rigid and resistant to flexure. Therefore the weight of the top is substantial, and in order to assist the operator in opening and closing a normal size top or cover 17, one, two, or more counterbalance members 39 in the form of a tension spring or the like are provided. As indicated, the member 39 is pivotally secured to a bracket 40 which is in turn secured to the frame or beam 22, the upper portion of the linkage arm of the counterbalance 39 being pivotally secured to the cover 17 as at 41. With particular attention being directed to FIGURE 1 it will be observed that the back member 14 is itself pivotally mounted on the base frame member 22, and the cover member 17 opens and closes relative to the back 14 with the front and back being opened simultaneously, and the ends 15 and 16 being released.

Particular attention is now directed for FIGURES 2, 3, 4, and 6 wherein the design of the individual module units 11 is shown. Each of these units, with the exception of the end units and the axial dimensions, are identical, one to the other, the end units being distinguishable with an additional movable surface being provided. Turning now to the unit shown in FIGURES 2 and 3, it will be seen that each module includes a bottom plate member 45 which serves as a mounting base member for the modulate to rest upon along the longitudinal beams 21 and 22. (This feature is shown in FIGURES 4 and 6). Each module contains a pair of lateral pivotal faces 47 and 48, these being pivotally mounted on the base 45 as at 49 and 50 respectively. A frame means, as illustrated, and shown at 51 including a plurality of upright struts or support arms, is utilized to hold the top member 52 firmly in place in order to provide a suitable working surface. The length of these struts may be altered readily, if required, in a production change-over. The frame mechanism 53 provides a means of supporting the working surface 52, and also is utilized to provide a suitable bearing surface for proper actuation of the pivotal plates as shown in detail in FIGURES 4 and 6. In this regard, the actuating system merely includes a pair of toggle arms 55 and 56 which are pivotally linked to the individual plates 47 and 48 at the pivot linkage 57 and 58 respectively. A central pivoting bracket is shown at 60, the member 60 being likewise secured to the actuating arm 61. The actuating arm 61 is in turn pivotally linked at 62 to the actuating arm or crank 63, arm 63 having a square jaw as as 64 for receiving the rotatable rectangular or square shanked shaft 65, which shaft is an integral part of shaft 75. A spring member such as the spring 66 is anchored at one end to the frame 53 and at the other end to the member 63. The normal position is shown in FIGURE 4 wherein the plates 47 and 48 are in their expanded configuration, the disposition shown in FIGURE 6 being the extended or taut disposition of spring 66.

As indicated previously, the end modules have three movable surfaces in order to present an expanded and collapsed form. In this connection, each of the end modules 68 and 69, as shown in FIGURES 5 and 7 is provided with a pivotally movable pressure plate 70. The plate 70 is, in each instance, controlled by link arm or actuating bar 71. One end of the link arm or actuating bar 71 is secured to the pressure plate 70, while the other end is secured to the actuating head 73. The actuating head 73 is secured, in turn, to the member 60 in the toggle linkage which actuates the lateral pressure plates, and actuation or expansion of this toggle linkage will move the head 73 which is coupled thereto downwardly, thus forcing the actuating bar 71 into the expanded configuration as is illustrated in FIGURE 5. It will be observed that each of the pivot points from which the pressure plates pivot about is disposed at a distance from the closest adjacent pressure plate edge. In this connection, the entire plate will be moved from proximity with the work and hence renders the removal easily and readily accomplished.

Attention is now directed to the specific actuating linkage, shaft, or the like as shown in FIGURES 5 and 7. In this connection, an elongated longitudinal shaft generally designated 75 is provided which is adapted for pivotal axial rotation in the bearing members 76 and 77. Suitable means are provided if necessary in order to permit the shaft to pass through any of the lateral cross-members provided. In order to rotate the shaft member 75 axially within the bearings 76 and 77, a clamp member 80 attached to the lower link 38 of the linkage 36 is secured to either end of the shaft 75. Thus, when the lid or cover member 17 is opened or closed, the lower link portion of the linkage mechanism 36 rotates about the shaft 75. As indicated clearly in FIGURES 4 and 6, the rotation of the shaft 75, particularly the square or rectangular cross section thereof, causes similar rotation to occur in the link arm 63, particularly about the axis of the jaw portion 64 therein. This motion also opens and closes the side walls 13 and 14 simultaneously.

In assembling the structure, the outer enclosure 10 is opened and made ready to receive the individual modules 11. The end module is preferably inserted in place, as required. The fine positioning of the modules on the longitudinal beam members or rails 21 and 22 is accomplished by means of the machined rest rail 84. The use of proper shims and the like in the area of the rest rail 84 will permit proper and permanent leveling of the modules within the confines of the enclosure, and upon the longitudinal beams or rails 21 and 22. When inserted, the jaw 64 encloses the rectangularly shaped shanked portion 65 therewithin, the rotation of the shaft 75 being in turn transmitted to the arm 63. Because of the physical arrangement of the jaw portion 64, there is no problem with causing the shank portion 65 to fall within the confines of the jaws 64 for rotation therewith. With each of the modular units such as the units 11 in place, the final end modular unit is set into position and the assembly is ready for use. As indicated previously, the number of modules which are included in the assembly will be determined by the requirements of the part being formed.

After insertion of the individual modules in place, the work is loaded into the fixture on top of the modules, as indicated in FIGURES 6 and 7, the work being designated 88. For proper positioning of the work on the modules, a controlled shim 89 is interposed between the transverse supports 23—23, and shims 90—90 are interposed between the work and the frame 45 of the individual modules 11. Thus, precise leveling can be achieved. Prior to the frothing of the resin mixture, the enclosure is closed about the work as indicated in FIGURES 4 and 5. In order to position ends 15 and 16 of the structure, an initial wedging effect is achieved between the cover and the individual end walls as at 91, the flanged members 92 along the ends of the top 17 being utilized to ride against the diagonal portion of the upstanding members 91 and ultimately lock them in place. The toggle clamp 93 on the front of the cover member 17 together with the front locking dog 94 accommodate and provide appropriate locking of the cover 17 relative to the front and back outer panels 13 and 14. Once the mechanism is closed and locked in place, the resin is filled, as is conventional in the art, expanded, and when the resin is at least initially set, the box-like enclosure is opened and the work such as the refrigerator box 88 is removed therefrom. The blocks 82 are shimmable spacing blocks. These blocks achieve precise longitudinal total pile up or longitudinal dimension for inside product control.

Since the common linkage is utilized to simultaneously expand or collapse the core, simultaneous release of pressure is available at each of the surfaces, thereby minimizing physical distortion of the product and permitting early removal of the pressure from the expandable core fixture. Thus, the expandable fixture will be disposed within the confines of an outer enclosure which is adapted to exert a force resisting the outward expansion of the device being fabricated, the device being fabricated accordingly being disposed in the annular zone between the core fixture and the outer enclosure.

In order to assist the assembly in obtaining uniform pressure throughout the annular zone provided for the product, and thus avoid the introduction of deformities along the product wall, the entire volume which is being provided with the frothed resin insulation is in common communication. Therefore, any excessive quantities or deficient quantities or raw resin materials in one local area may be compensated for on an over-all basis by providing open communication between the various areas undergoing simultaneous expansion. The internally disposed expandable core fixture will not shift physically during the expansion operation and uniform product dimensions are accordingly achieved.

With particular attention being directed to FIGURE 1, it is seen that a link arm 36 may be provided at each end of the fixture. Each one will be coupled at its lower arm portion 38 to the drive shaft 75. As seen in FIGURE 1, the lower portion 38 of the arm 36 is provided with a pivot bearing member 97 which, in turn, is received in a slot with the arcuating arm member 98. The povotal linkage at 99 couples the arm 98 to the arm 100, the arms 98 and 100 being secured as indicated, to the side walls 13 and 14. Thus, with continued reference to FIGURE 1, it will be seen that the counterclockwise rotation of the link 38 will cause the pivot point 99 to move vertically downwardly, and this motion of the linkage will close the outer wall surfaces 13 and 14 simultaneously into the area of the work. Thus, a single lifting action on the link arm 36 collapses the modules, and opens the side walls to permit easy withdrawal of the work from the fixture.

In a conventional operating situation, the height of the enclosure will be controlled by static means, and removal of the work can be accomplished by collapsing two oppositely disposed walls of the module and opening the outer walls of the enclosure. Accordingly, each of the movable surfaces will be linked with the drive shaft, the linking means being adapted to resist the force which is exerted against the surface of the module. A conventional production arrangement will employ at least two modules, and most likely will employ three or more. Because of the normal graduation of sizes required for commercial refrigerators and freezers, the individual modules may have a length which is compatible with the normal size graduation so that the provision of or the withdrawal of a given module will be compatible with the modification of size or axial lengths of the unit.

In certain refrigerators and freezer boxes, it is sometimes necessary to have a divider plate disposed traversely across the enclosure. In this type of operation, it is essential to use two sets of internal modules, each set having its own pair of end plates to apply force against the internal divider. In any event, the modules are adapted to be free-floating within the enclosure and hence no unusual tie-down requirement exists.

It will, of course, be understood that various changes may be made in the form, details, arrangements, and proportions of the parts wihtout departing from the scope of the invention as set forth in the appended claims.

What is claimed is:

1. In apparatus for applying mechanical pressure to an article retained within external and internal walls defining a chamber during the frothing of a resin within said article, the article comprising a hollow structure having outer wall surfaces enclosing a core zone therebetween:
    (a) an outer shell for said chamber adapted to receive said hollow core structure and having an inner wall disposed in abutting relationship to the outer wall surface of the hollow core structure of said article,
    (b) means for blocking the walls of said outer shell in predetermined disposition, and
    (c) internal blocking means forming internal walls within said chamber and having surfaces adapted to be disposed in abutting relationship to the inner surfaces of said hollow shell, said internal blocking means comprising a plurality of modular units, each having at least two laterally disposed pressure applying surfaces mounted for pivotal rotation between an expanded and contracted disposition, and a common drive means comprising an axially rotatable drive shaft having a drive surface disposed along the shank portion thereof, and mounted for rotation between first and second angularly spaced positions, and drive means integral with each of said modular units for moving said pressure applying surfaces between expanded and contracted disposition in response to rotation of said shaft, said modular units being adapted to be received in coupling relationship to said drive shaft only when said drive shaft is in a preselected one of said positions.

2. The apparatus as defined in claim 1 being particularly characterized in that the drive surface portion of said drive shaft has at least two spaced parallely disposed drive surfaces.

3. The apparatus as defined in claim 1 being particularly characterized in that the drive surface portion of said rotatable drive shaft has a substantially rectangular cross section with two dissimilar dimensions, one dimension being substantially smaller than the other, said drive shaft being rotatable axially between a first and a second position, the positions being separated by substantially less than 180° of an arc.

4. The apparatus as defined in claim 1 being particularly characterized in that said modular units have varying axial lengths.

5. The apparatus of claim 1 being particularly characterized in that said outer shell is adapted to receive articles of hollow core structure having different axial length.

6. The apparatus of claim 1 being particularly characterized in that tension means are provided for resiliently biasing the said driven means in said first position.

7. In apparatus for applying mechanical pressure to an article retained within external and internal walls defining a chamber during the frothing of a resin within said article, the article comprising a hollow structure having outer wall surfaces enclosing a core zone therebetween:
    (a) an outer shell for said chamber adapted to receive said hollow core structure and having an inner wall disposed in abutting relationship to the outer wall surface of the hollow core structure of said article,
    (b) means for blocking the walls of said outer shell in predetermined disposition, and
    (c) internal blocking means forming internal walls within said chamber and having surfaces adapted to be disposed in abutting relationship to the inner surfaces of said hollow shell, said internal blocking means comprising a plurality of modular units, each modular unit having two oppositely disposed lateral pressure applying surfaces and one longitudinally disposed pressure applying surface which pivots outwardly from said module along a direction substantially normal to the direction of pivotal rotation of said laterally disposed surfaces, each pressure applying surface being mounted for pivotal rotation between an expanded and contracted disposition and a common drive means comprising an axially rotatable drive shaft having a drive surface disposed along the shank portion thereof and mounted for rotation between first and second angularly spaced positions, and drive means integral with each of said modular units for moving said pressure applying surfaces between expanded and contracted disposition in response to rotation of said shaft, said modular units being adapted to be received in coupling relationship to said drive only when said drive shaft is in a preselected one of said dispositions.

8. The apparatus as defined in claim 7 being particularly characterized in that said common drive means actuate each of said pressure applying surfaces simultaneously.

9. The apparatus as defined in claim 7 being particularly characterized in that, drive means actuate the walls of said outer shell structure and each of said pressure applying surfaces simultaneously.

10. In apparatus for applying mechanical pressure to an article retained within external and internal walls defining a chamber during the frothing of a resin within said article, the article comprising a hollow structure having outer wall surfaces enclosing a core zone therebetween:
    (a) an outer shell for said chamber adapted to receive said hollow core structure and having an inner wall disposed in abutting relationship to the outer wall surface of the hollow core structure of said article, (b) means for opening the walls of said outer shell and for blocking the walls of the outer shell of said chamber in predetermined disposition, and (c) internal blocking means forming internal walls within said chamber and having surfaces adapted to be disposed in abutting relationship to the inner surfaces of said hollow shell, said internal blocking means comprising a plurality of modular units arranged in free-floating disposition within said outer shell, each modular unit having at least two laterally disposed pressure applying surfaces mounted for pivotal rotation about an axis spaced from the edge of the pressure applying surface, and arranged to move between an expanded and contracted disposition, and a common drive means comprising an axially rotatable drive shaft having a drive surface disposed along the shank portion thereof, and mounted for rotation between first and second angularly spaced positions, and drive means integral with each of said modular units for moving said pressure applying surfaces between expanded and contracted disposition in response to rotation of said shaft, said modular units being adapted to be received in coupling relationship to said drive shaft only when said drive shaft is in a preselected one of said dispositions.

11. The apparatus as defined in claim 10 being particularly characterized in that, drive means actuate the walls of said outer shell structure and each of said pressure applying surfaces simultaneously.

12. In apparatus for applying mechanical pressure to an article retained within external and internal walls defining a chamber during the frothing of resin within said article, the article comprising a hollow structure having outer wall surfaces enclosing a core zone therebetween:

(a) an outer shell for said chamber comprising a plurality of lateral wall surfaces, each of said lateral wall surfaces being adapted to pivot outwardly from said chamber, and being adapted to receive said hollow core structure, said outer shell having an inner wall disposed in abutting relationship to the outer wall surface of tne hollow core structure of the said article, and (b) means for blocking the walls of the outer shell of said chamber in predetermined disposition, said internal blocking means forming internal walls within said chamber and having surfaces adapted to be disposed in abutting relationship to the inner surfaces of said hollow shell, said internal blocking means comprising a plurality of modular units, each having at least two laterally disposed pressure applying surfaces mounted for pivotal rotation between an expanded and contracted disposition and a common drive means comprising an axially rotatable drive shaft having a drive surface disposed along the shank portion thereof, and mounted for rotation between first and second angularly spaced positions, and drive means integral with each of said modular units for moving said pressure applying surfaces between expanded and contracted disposition in response to rotation of said shaft, said modular units being adapted to be received in coupling relationship to said drive shaft only when said drive shaft is in a preselected one of said dispositions.

References Cited by the Examiner
UNITED STATES PATENTS

| 2,827,683 | 3/1958 | Benart et al. | 25—130 |
| 2,948,926 | 8/1960 | Kühn | 18—5 |
| 3,015,851 | 1/1962 | Wiles | 18—5 X |
| 3,163,686 | 12/1964 | Dusel et al. | 18—5 X |

J. SPENCER OVERHOLSER, *Primary Examiner.*

E. MAR, *Assistant Examiner.*